United States Patent [19]

Hale

[11] 4,429,406

[45] Jan. 31, 1984

[54] ARRANGEMENT FOR CHECKING THE SYNCHRONIZATION OF A RECEIVER

[75] Inventor: John M. Hale, RedHill, England

[73] Assignee: U.S. Philips Corporation, New York, N.Y.

[21] Appl. No.: 372,346

[22] Filed: Apr. 27, 1982

[30] Foreign Application Priority Data

Apr. 29, 1981 [GB] United Kingdom ................ 8113287

[51] Int. Cl.³ ........................................... H04L 7/06
[52] U.S. Cl. ..................................... 375/113; 375/94; 340/347 SH
[58] Field of Search ...................... 375/17, 55, 94, 110, 375/113; 328/63, 72, 74; 370/100; 371/42, 46; 340/347 SH

[56] References Cited

U.S. PATENT DOCUMENTS

| | | | |
|---|---|---|---|
| 3,846,583 | 11/1974 | Boulter | 375/55 |
| 4,176,248 | 11/1979 | Sheets | 375/94 |
| 4,313,088 | 1/1982 | Van Gerwen et al. | 375/110 |
| 4,313,203 | 1/1982 | Van Gerwen et al. | 375/17 |
| 4,317,212 | 2/1982 | Van Gerwen et al. | 375/113 |

Primary Examiner—Robert L. Griffin
Assistant Examiner—Stephen Chin

Attorney, Agent, or Firm—Thomas A. Briody; William J. Streeter; Edward W. Goodman

[57] ABSTRACT

When frequency division is used as part of the clock signal regeneration process from a received data signal, a phase ambiguity may occur. A data signal receiver for a bi-phase modulated signal comprises a filter 1 feeding a sampling switch 2 which feeds a polarity detector 3 from which the decoded data is reproduced. The phase of the sampling switch 2 is controlled by the output 6-Q of a ÷2 frequency divider 6 which is driven by a phase-locked loop 5 which in turn is driven by a zero-crossing detector 4 at twice the bit frequency. A monitoring arrangement 8 has sampling switches 10 and 11 driven by outputs 6Q and 6-Q̄ of the frequency divider 6. The data signal applied through a full-wave rectifier 9, is sampled at instants $t_o$ and $t_1$, at twice the bit frequency. The outputs of the sample switches 10 and 11 are fed to minimum voltage detectors 12 and 13, respectively, which detect the minimum value of the samples over a number of cycles of the respective input and apply this value to the inputs of a comparator 14. If the output of detector 12 is more positive than that of detector 13, the receiver is correctly synchronized but if the output of detector 13 becomes more positive than that of the detector 12, the output of the comparator changes state and causes a pulse to be applied to input 6-1 of the divider to change the phase of the divider output 6-Q.

3 Claims, 6 Drawing Figures

ARRANGEMENT FOR CHECKING THE SYNCHRONIZATION OF A RECEIVER

BACKGROUND OF THE INVENTION

The invention relates to an arrangement for checking the synchronization of a receiver for data signals, having a power-versus-frequency spectrum comprising two sidebands located one on each side of a symbol frequency, in which the received data signal is sampled in each symbol interval at two synchronous instants which are half a symbol interval apart.

Arrangements of the above type are called monitoring arrangements. Synchronizing the receiver is usually effected by a clock signal device which derives a synchronous clock signal from the data signal on the basis of clock information present in the data signal itself. By means of a non-linear processing of the received data signal a strong signal component having a frequency of twice the symbol frequency can be obtained. The clock signal, which is required for signal regeneration, must be derived from this signal component by means of frequency division, which causes an ambiguity in the phase of the clock signal. A monitoring arrangement serves to determine the correct phase of the clock signal.

In a monitoring arrangement for bi-phase modulation (manchester code) described in U.S. Pat. No. 4,317,212, the monitoring criterion is derived by integrating the samples over a number of cycles of the received signal to determine whether the average power at the first sampling instant is greater than that at the second sampling instant.

From the eye patterns shown in the aforementioned patent and in FIG. 4 of the drawings accompanying this specification, it can be seen that the true eye, i.e. the eye which should correspond to the first sampling instant, contains only full amplitude excursions while the false eye is likely to contain lines which cross the eye of approximately zero voltage. Consequently, when averaged over many bit periods, the power in the true eye is greater than that in the false eye. The monitoring arrangement disclosed in the aforementioned patent uses this principle to differentiate the two eyes and effect reframing if the clock signal is incorrectly phased.

Although this arrangement is workable, there are some limitations in practice which are not apparent from a paper study of the problem. For example, it is often found that the peak amplitude of the false eye is greater than that of the true eye which erodes the power difference between the two eyes. Further, the nominally zero voltage transitions in the false eye may in fact have considerable amplitude so further eroding the power difference. Finally, the signal can contain considerable low frequency noise components due to the operation of sample and hold circuits in earlier stages of the overall system. The outcome of these defects is that it becomes progressively more difficult to distinguish between the true and false eyes as the transmission medium's attenuation is increased without resorting to excessive time constants in the integrating circuits.

SUMMARY OF THE INVENTION

It is an object of the invention to provide a monitoring arrangement of the type referred to in which at least some of the disadvantages discussed above are mitigated.

The invention provides an arrangement for checking the synchronization of a receiver for data signals are described in the opening paragraph characterized in that the arrangement comprises means for detecting the minimum value of the sampled signal at each of the two instants and means for generating a check signal whose value is dependent on whether the minimum level over a number of cycles of the input data of the signal sampled at the first instant is greater than that of the signal sampled at the second instant.

Such an arrangement has the advantage that it is not affected by the erosion of power difference between the two eyes when the peak amplitude of the false eye is greater than that of the true eye since the differentiation between true and false eyes is based on the minimum levels detected within each eye.

DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
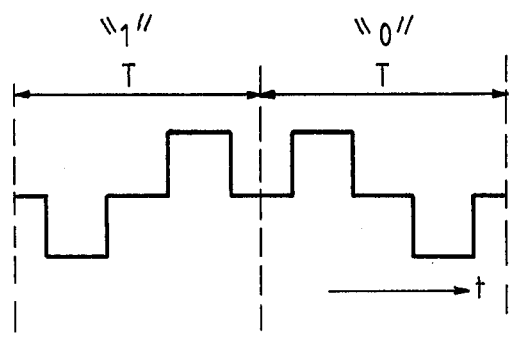
FIG. 1 shows data signal waveforms associated with the "crank-shaft" code.
Figure 2:
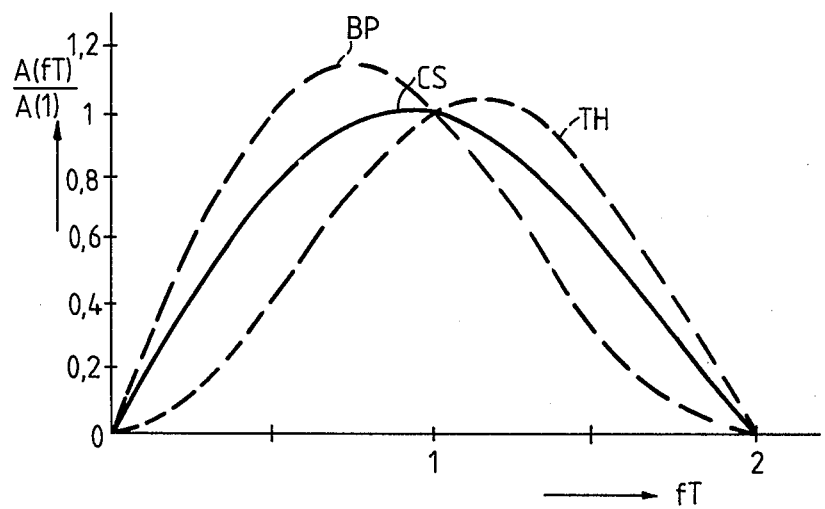
FIG. 2 shows some amplitude spectra of different coding (modulation) methods.

In FIG. 1, the signal waveforms for the data symbols "1" and "0" in a symbol interval of T seconds are shown, these data symbols being encoded in accordance with the "crankshaft" code which is so-called because of the shape of the waveform. The amplitude spectrum of the "crankshaft" code is represented in FIG. 2 by curve CS. The amplitude spectrum for ordinary bi-phase modulation is represented in FIG. 2 by curve BP. The curve TH in FIG. 2 illustrates the amplitude spectrum for a so-called "top hat" code which is another form of bi-phase modulation in accordance with the U.S. Pat. No. 3,846,583.

The "crankshaft" code, bi-phase modulation and the "top hat" code are examples of codes in which the coded or modulated signal is a double sideband signal having the symbol frequency $1/T$ Hz as the carrier frequency. The following description relates to the "crankshaft" code. Adaptations necessary for the bi-phase modulation and "top hat" codes will be mentioned at the end of the description.

Figure 3:
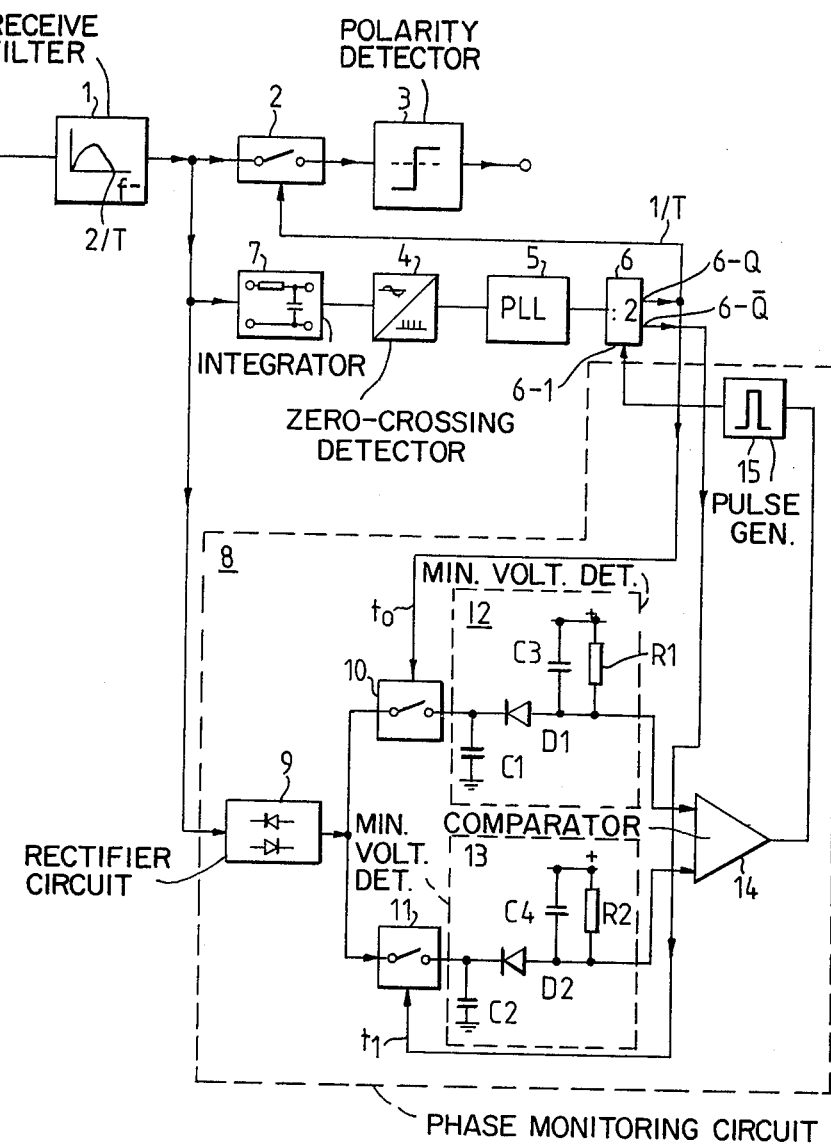
FIG. 3 is a block diagram of a receiver provided with a monitoring arrangement according to the invention.

As shown in FIG. 3, a receiver for the "crankshaft" code comprises a receive filter 1, a sampling switch 2 and a polarity detector 3. The optimum receive filter is a low-pass filter having a cut-off frequency which is twice the bit-frequency $2/T$ Hz. Between 0 Hz and $2/T$ Hz the filter amplitude-versus-frequency characteristic has a sinusoidal variation as defined by the expression:

$$j \sin(wT/4) \tag{1}$$

An approximation of the spectrum of the "crankshaft" code is also given by expression (1). The result is that at the output of receive filter 1 the spectrum is approximately defined by the expression:

$$\sin^2(wT/4) \qquad (2)$$

Figure 4A:
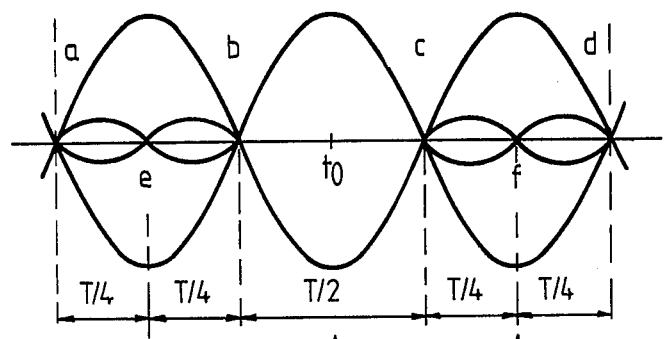
FIGS. 4A–4C show some eye patterns.

Signals having a spectrum as defined by expression (2) have an eye pattern which is illustrated in FIG. 4a, for which the sampling switch 2 would have to sample the received data signal at the sampling instants $t_o \pm nT$ for optimum reception.

The clock signal channel of the receiver comprises, in a conventional manner, a zero-crossing detector 4, a phase-locked loop (PLL) 5 and a divide-by-two frequency divider 6. Arranged between the output of the receive filter 1 and the zero-crossing detector 4, is an integrator 7 which effects that zero-crossings occurring at the input of detector 4 are a multiple of T/2 seconds apart. Disturbing zero-crossings at a distance of T/4 seconds to the desired zero-crossings are eliminated by integrator 7. In FIG. 4a the desired zero-crossings are denoted by a, b, c and d and the disturbing zero-crossings by e and f.

A strong signal component having a frequency equal to twice the symbol frequency 2/T Hz is produced at the output of zero-crossing detector 4. This component is selected by the phase-locked loop 5. Frequency divider 6 divides the frequency by two to obtain the symbol frequency 1/T Hz.

Frequency divider 6 has two outputs 6-Q and 6-$\overline{Q}$. The sampling pulses which must occur at the instants $t_o \pm nT$ (FIG. 4a) are derived from output 6-Q. The pulses which occur at output 6-$\overline{Q}$ are located half way between the pulses occuring at output 6-Q. The instant determined by these pulses are indicated by $t_1 \pm nT$. (FIG. 4). The instant $t_1$ differs by T/2 seconds from the instant $t_o$. FIG. 4a shows the proper location of the instant $t_o$ and $t_1$ with respect to the eye pattern. If frequency divider 6 has not been adjusted to the proper phase, the data signal is sampled by sampling switch 2 in that portion of the eye pattern where the disturbing zero-crossings e and f are situated. This results in falsification of regenerated data.

Frequency divider 6 includes a control input 6-1 for adjusting this divider to the proper phase. A phase monitoring circuit 8, which is connected to the output of receiver filter 1, is connected to control input 6-1.

The phase monitoring circuit 8 comprises a full wave rectifier circuit 9 whose output is connected to two sampling switches 10 and 11 which are controlled by the outputs 6-Q and 6-$\overline{Q}$, respectively, of the frequency divider 6 so that the switch 10 samples the output of the rectifier circuit 9 at the instants $t_o \pm nT$ and the switch 11 samples the output of the rectifier circuit 9 at the instants $t_1 \pm nT$.

The signal samples at the outputs of the sampling switches 10 and 11 are fed to first and second minimum voltage detectors 12 and 13, respectively. The detector 12 comprises a capacitor C1, a diode D1 and the parallel arrangement of a capacitor C3 and a resistor R1. The capacitor C1, diode D1 and the parallel arrangement are connected in series between a positive supply line and ground. The junction of the capacitor C1 and diode D1 is connected to the output of the sampling switch 10 while the junction of the diode D1, capacitor C3 and resistor R1 is connected to a first input of a comparator 14. The detector 13 comprises a capacitor C2, a diode D2 and the parallel arrangement of a capacitor C4 and a resistor R2 interconnected in the same manner as described for the detector 12 and is connected between the output of the sampling switch 11 and a second input of the comparator 14. The output of the comparator 14 is fed to a pulse generator 15, which may be a monostable multivibrator, to reset the frequency divider 6 via the control input 6-1 when the clock signal is wrongly phased.

As shown in FIG. 3 the detectors 12 and 13 will produce an output signal whose amplitude is dependent on the most negative sampled signal applied to the capacitor C1 in the case of detector 12 and C2 in the case of detector 13. The sampled signal at the output of the switch 10 is stored in capacitor C1. The voltage at the junction of diode D1 and resistor R1 will depend on the voltage across capacitor C1 as long as the diode D1 is forward biassed and capacitor C2 will become charged to the voltage across resistor R1. If the sampled signal voltage becomes more positive, then the diode D1 will be cut off and the voltage at the output of the detector 12 will remain at the more negative previous level for a period dependent on the time constant of the parallel arrangement C3, R1. Thus the detector 12 will produce an output signal which is dependent on the least positive sample applied to the capacitor C1. Similarly the detecter 13 produces an output signal dependent on the least positive sample applied to the capacitor C2. The detector circuits 12 and 13 are shown constructed for use with a rectifier circuit 9 which produces positive voltages with respect to ground. If the rectifier circuit 9 were oppositely connected, i.e. producing only negative going voltages, then the diodes D1 and D2 would have to be oppositely poled and a negative supply line substituted for the positive supply line.

Figure 4B:
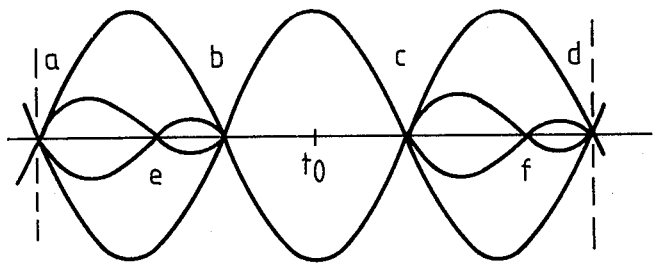
Figure 4C:
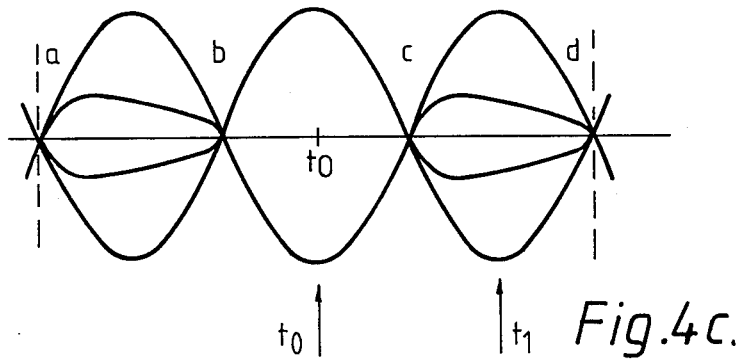

The monitoring criterion uses the fact that in the portion of the eye pattern in which the disturbing zero crossings e, f are located, the signal amplitude at the sampling instants may have a low value, depending on the data (FIG. 4a). The disturbing zero crossings e, f may change their position when a cable is present between the transmitter and the receiver, as shown in FIG. 4b and 4c which illustrate the eye pattern at increasing cable length. However, it can be seen from FIGS. 4b and 4c that signal samples having a low amplitude will continue to occur in this portion of the eye pattern. Consequently, if the phase of the derived clock is correct, the output of the detector 12 will be more positive than that of the detector 13. If, however, the output of the detector 13 becomes more positive than that of the detector 12, the output of the comparator 14 change state and triggers the pulse generator 15 which produces a short pulse to reset the frequency divider 6 and change the phase of the clock.

Since each detector 12, 13 detects the lower voltage during a series of pulses in its own portion of the eye pattern, this method overcomes the problems caused when the peak amplitude of the signal in the false eye is greater than that in the true eye.

The eye pattern of the "top hat" code has also a portion in which, depending on the data, signal amplitudes having a low value may occur. Thus, the described monitoring arrangement can also be directly used for the "top hat" code. The difference in the receiver shown in FIG. 3 will be in the shape of the filter characteristic of receive filter 1. When the "top hat" code is used, the receive filter 1 may have a uniform amplitude-versus-frequency characteristic up to the cut-off frequency of 2/T Hz.

In practice, it has been found that an ordinary biphase modulated signal which is passed through a differentiator has an eye pattern which is comparable to the eye pattern at the output of receive filter 1 when the "crankshaft" code is used. For use with ordinary biphase modulation, monitoring circuit 8 must then be preceded by a differentiator. Also, in this case, receive filter 1 may have a uniform amplitude-versus-frequency characteristic.

While the arrangement has been described in conjunction with a data receiver using analogue processing, it is not restricted to use with such a receiver but could also be used with receivers in which the received signal is digitally processed.

I claim:

1. An arrangement for checking the synchronization of a receiver for data signals having a power-versus-frequency spectrum comprising two sidebands located one on each side of a symbol frequency, the received data signal being synchronously sampled in each symbol interval at first and second instants which are half-a-symbol interval apart characterised in that the arrangement comprises means for detecting the minimum value of the sampled signal at each of the two instants and means for generating a check signal whose value is dependent on whether the minimum levels over a number of cycles of the input data of the signal sampled at the first instant, is greater than that of the signal sampled at the second instant.

2. An arrangement as claimed in claim 1, wherein the means for detecting the minimum value of the sampled signal at the first and second instants comprises a first and a second detector, each of said detectors comprising an input and an output, a first capacitor coupling said input to a negative supply line, a diode also connected to said input, and a parallel combination of a second capacitor and a resistor coupling said diode to a positive supply line, said output being connected to the junction of said diode and said parallel combination.

3. An arrangement as claimed in claim 2 further comprising a comparator having first and second inputs to which the outputs of the first and second detectors are respectively connected, a check signal being derived from the output of the comparator.

* * * * *